US005821511A

United States Patent [19]

Williams et al.

[11] Patent Number: 5,821,511

[45] Date of Patent: Oct. 13, 1998

[54] VENDING AND DISPLAY DEVICE ELECTRONIC COUNTER

[76] Inventors: Forrest Williams, 4820 Powell Rd., Fairfax, Va. 22032-2839; Nader Hajian, 8913 Lido La., Port Richey, Fla. 34668

[21] Appl. No.: 816,522

[22] Filed: Mar. 13, 1997

[51] Int. Cl.[6] .................... G06K 15/00

[52] U.S. Cl. .................... 235/381; 235/383; 340/825.35; 453/20; 221/197

[58] Field of Search .................... 235/381, 383; 340/825.35; 453/20; 221/197

[56] References Cited

U.S. PATENT DOCUMENTS 5,303,844 4/1994 Muchlerger .................... 235/381

*Primary Examiner*—Don Wong

*Attorney, Agent, or Firm*—Whitham, Curtis & Whitham

[57] ABSTRACT

A vending machine/display unit (10) includes a plurality of articles (14) arranged on a plurality of dispensing paths (20 or 22). A counting mechanism is associated with each dispensing path, and includes an encoder bar (32) positioned adjacent the dispensing path, and encoder head (34) positioned to incrementally advance along the dispensing path. The encoder head (34) includes a plurality of contact members (42*a–d*) which interact with a plurality of active site contact members (40) disposed on the encoder bar (32) in a pattern which uniquely identifies each incremental position in the dispensing path. The inventory of articles (14) remaining in a dispensing path or the accounting of articles (14) dispensed from the dispensing path is determined from the relative position of the encoder head (34) to the encoder bar (32), and this position is detected from the active contact site points (40) on the electrical information lines (36) on the encoder bar (32).

11 Claims, 4 Drawing Sheets

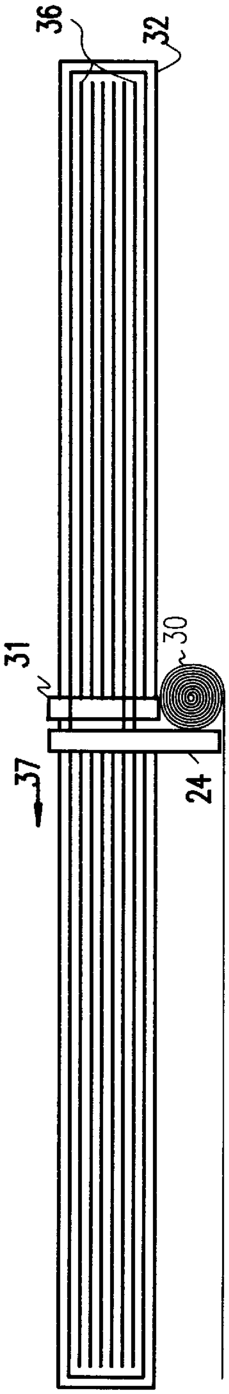
FIG.3 (SIDE VIEW)
| CKT # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 (1) | 0 | 1 | 0 | 1 | 0 | 1 | 0 | 1 | 0 | 1 | 0 | 1 | 0 | 1 | 0 | 1 |
| 1 (2) | 0 | 0 | 1 | 1 | 0 | 0 | 1 | 1 | 0 | 0 | 1 | 1 | 0 | 0 | 1 | 1 |
| 2 (4) | 0 | 0 | 0 | 0 | 1 | 1 | 1 | 1 | 0 | 0 | 0 | 0 | 1 | 1 | 1 | 1 |
| 3 (8) | 0 | 0 | 0 | 0 | 0 | 0 | 0 | 0 | 1 | 1 | 1 | 1 | 1 | 1 | 1 | 1 |
PACKS PRESENT
FIG.4 ( STATE TABLE)
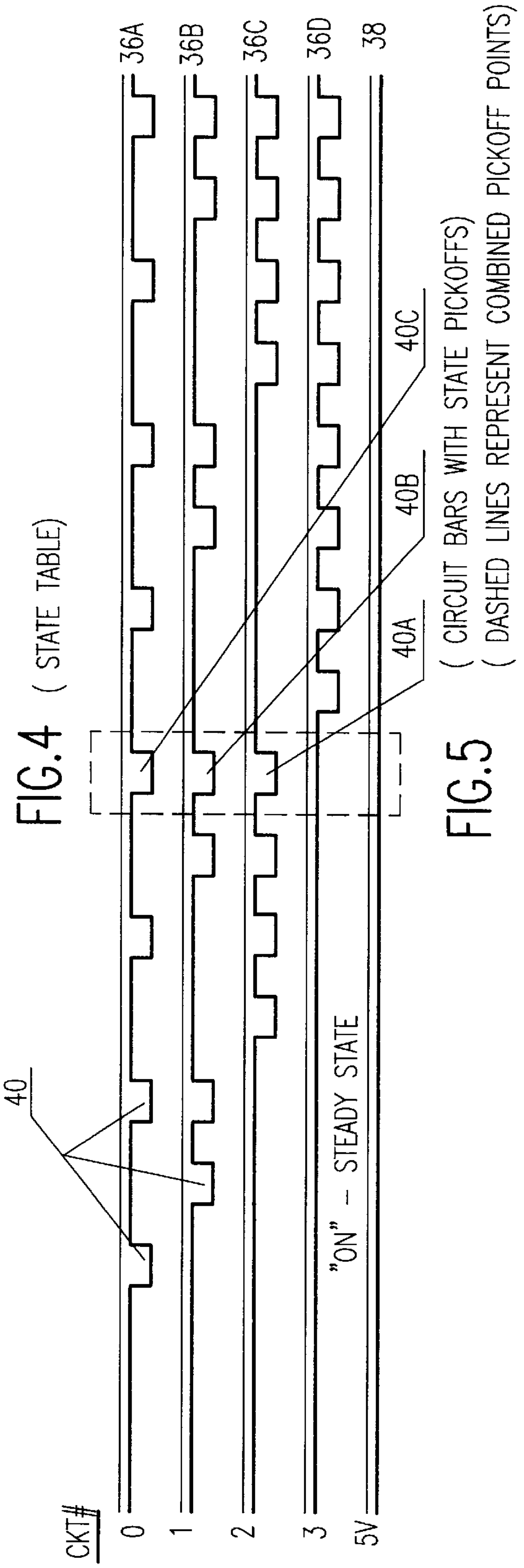
FIG.5

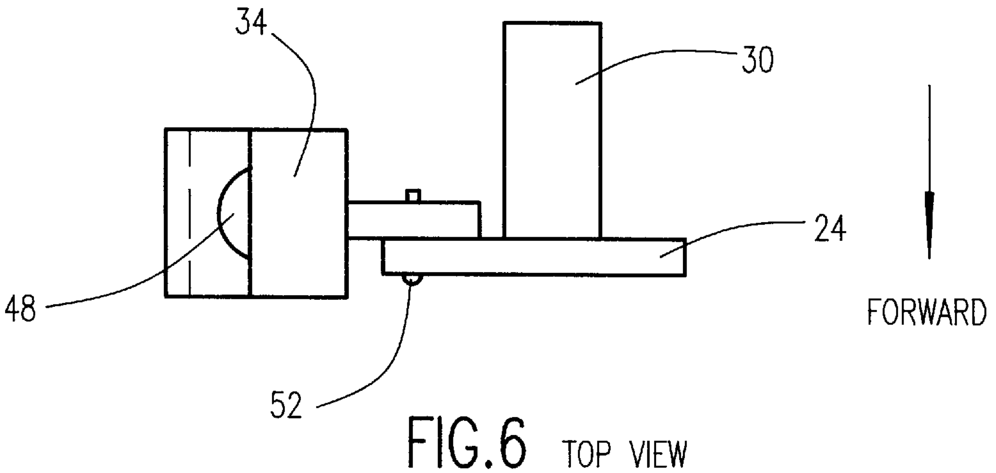
FIG.6 TOP VIEW
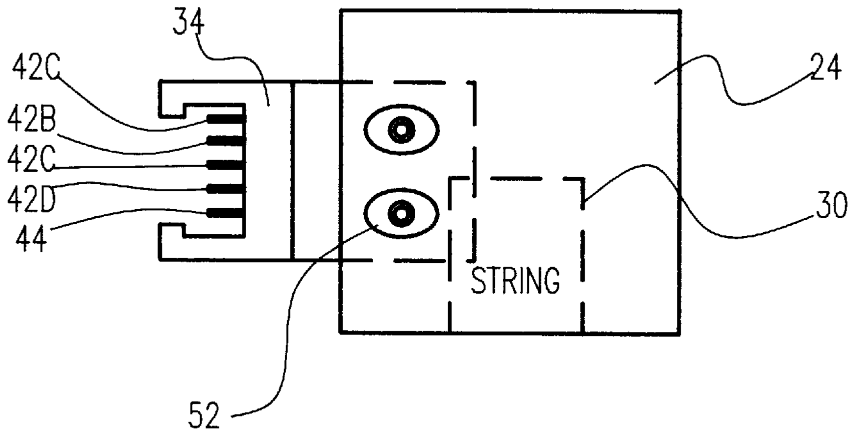
FIG.7 FRONT VIEW

VENDING AND DISPLAY DEVICE ELECTRONIC COUNTER

BACKGROUND OF THE INVENTION

1. Field of the Invention

The invention is generally related to vending machines and has particular application to any packaged/canned article dispensing machine or display unit. More specifically, the invention is an electronic counter designed to provide easy and accurate inventory of packaged articles (such as boxes of candy or cigarette packs) and canned/bottled products (such as beverages) in a vending machine or other dispensing/display apparatus where the packaged articles traverse along a dispensing path, vertically or horizontally, without requiring removal and hand counting of all the packaged articles in the dispensing path.

2. Description of the Prior Art

Packaged articles, such as boxes of candy and cigarette packs, and canned/bottled products, such as beverages, are commonly sold in vending machines or displayed/stored in vertical or horizontal racks for convenience of removal and purchases, such as occurs in convenience stores. In the case of vending machines, the packaged and canned/bottled articles are stored in trays that are viewed by the customer through a window. Upon inserting correct payment into the vending machine, a mechanical mechanism or gravity incrementally moves the row of articles along the tray to a point where a single article is dispensed. In other display/storage units, such as in convenience and grocery stores, boxes of candy or cigarette packs are stored and displayed in containers with racks that facilitate easy removal of the articles for purchase. In many commercial establishments, the number of articles that are dispensed by a particular vending machine or display unit need to be inventoried on a daily basis to satisfy accounting, replenishment, and stocking decision needs. Typically, the number of articles in stock in the trays cannot be readily discerned through the window, as the articles are positioned one behind the other or one above the other. Thus, for most vending machines and display units, personnel of the commercial establishment are required to empty each tray of the device and physically count the number of articles which remain in each tray. Many vending machines and display units can hold several hundred to several thousand articles, such as boxes of candy or cigarette packs, to be dispensed. Therefore, the daily inventory is a long and tedious process which is subject to human error.

There are a number of prior art vending machines/display units that provide inventory control devices and methodologies. Some examples can be found in U.S. Pat. Nos. 4,639,875 to Abraham et al; 4,834,231 to Awane et al.; 4,907,250 to Ricks; 5,207,784 to Schwartzendruber; 5,252,948 to Goris et al.; 5,272,321 to Otsuka et al.; and 5,442,568 to Ostendorf et al. These devices typically use complex optical sensing and the like, and may not be useful in providing inventory information by brand. In addition, optically based counting systems may suffer computing problems which result from power outages and the like.

What is needed is a low cost, accurate, article counting device, which is not susceptible to memory loss or other computing problems which occur during power outages.

SUMMARY OF THE INVETION

It is an object of this invention to provide an article counting device useful in vending machines and display units that utilizes electronic circuitry to count the number of articles in a dispensing tray.

It is another object of this invention to provide an apparatus which can rapidly and accurately detect and display the number of articles in a vending machine or display unit and the number of articles which have been dispensed from the vending machine or display unit.

It is yet another object of this invention to provide a counting mechanism for use in a vending machine or display unit which operates in conjunction with a moveable portion used to dispense articles from the vending machine or display unit.

According to the invention, an encoder bar is positioned at the side of each tray that is used in vending machine or display unit. The bar could also be under or over the tray. A counter head is positioned to interact with the encoder bar, and to move with a sliding support member that is used to move a stack of articles towards one end of the tray to dispense articles from the tray on an incremental basis. Each incremental position of the counter head as it is moved along the length of the tray is determined electronically using the encoder bar wherein each position is defined by a unique code of "On" and "Off" states for a plurality of "state" pick off points located on a plurality of different coding lines in the encoder bar. The incremental position of the counter head can be used to discern the number of articles remaining in the tray as well as the number of articles which have been dispensed from the tray. The "On" or "Off" states can be determined by electrical contact, optical recognition, or by other means. A display is provided to indicate to the user the inventory information. This information could also be provided in "real time" via modem and line (to include phone, cellular, remote sensor and satellite) to any appropriate organization or electronic device.

The electronic "On" and "Off" information for each tray could be reviewed separately, or pooled with the information from other trays in the vending machine or display unit such that the user could accurately determine the number of articles remaining of any particular brand. For example, brand X articles could be positioned in five trays of the vending machine or display unit, while brand Y articles could be positioned in two trays. By sensing the position of the counter head in each of the five trays for brand X and each of the two trays for brand Y, the personnel servicing the vending machine or display unit could be provided with a display that indicates the total number of brand X articles remaining, the total number of brand Y articles remaining, and the number of X or Y articles which are located in each of their respective trays.

The counting mechanism is unaffected by power outages and the like since the mechanical position of the counter head relative to the encoder bar does not change with changes in power. Thus, upon re-establishment of power, the absolute number of units dispensed or remaining in the vending machine or display unit can be automatically assessed based on the position of the counter head relative to the encoder bar.

BRIEF DESCRIPTION OF THE DRAWINGS

The foregoing and other objects, aspects and advantages will be better understood from the following detailed descriptions of the preferred embodiments of the invention with reference to the drawings, in which:

FIG. 3 is a side view of an encoder head slidably connected to an encoder bar according to the invention;

FIG. 4 is an example of an encoder state table according to the invention;

FIG. 5 is a schematic side view of electronic information lines on the encoder bar of this invention, with a plurality of "state" pick off points arranged in a pattern according to the invention;

FIG. 6 is a top view of an example of an encoder head according to this invention;

FIG. 7 is a side view of an example of an encoder head according to this invention.

DETAILED DESCRIPTION OF THE PREFERRED EMBODIMENTS OF TIHE INVENTION

Figure 1:
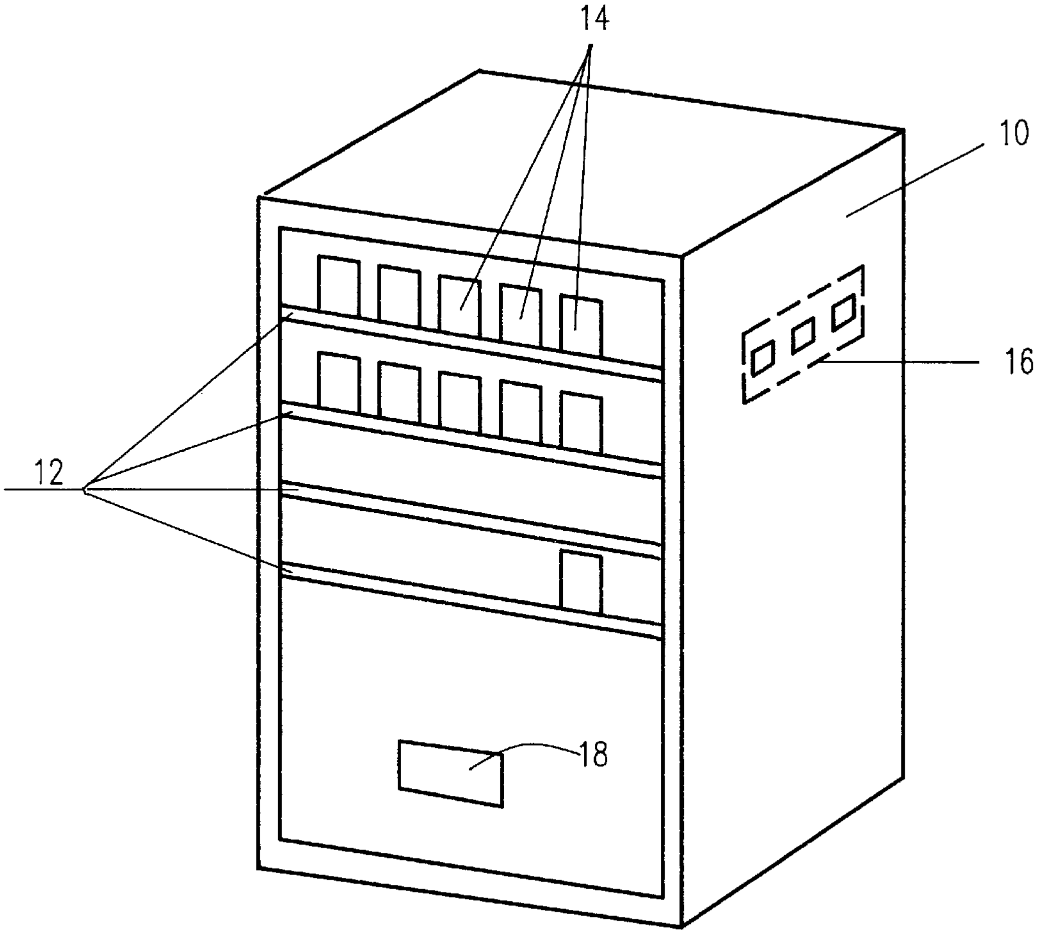
FIG. 1 is an isometric illustration of a vending machine/display unit.

FIG. 1 shows a vending machine/display unit 10 having a plurality of shelves 12. On each of the shelves 12 are a plurality of trays, each of which carry a plurality of articles 14. Cigarette packs or boxes of candy are commonly dispensed from vending machines/display units, and this invention has particular application to cigarette or candy vending machines or other storage and display units as well as vending machines that sell canned and bottled beverages or other liquid products; however, it should be understood that this invention can be employed in conjunction with a wide variety of other vending machines/display units 10 in either vertical or horizontal modes using mechanical means or gravity to move the articles. As is shown in the cut-away section 16, the articles 14 are stacked one behind the other. In a vertically stacked vending machine or display unit, the articles 14 would be stacked one on top of the other. In a vending machine 10, after a purchaser inserts sufficient payment, the stacked articles which are selected move forward incrementally to allow one of the articles 14 to drop from its shelf 12 to dispensing slot 18 where it is retrieved by the purchaser. In a display unit 10, the customer or employee removes the desired article 14 for purchase and remaining items on the tray 12 slide forward (or down in the case of a vertically stacked unit). The number of shelves 12 and number of articles 14 in a vending machine or display unit can be varied considerably. Vending machines or display units 10 within the scope of this invention can house hundreds to thousands of articles 14. In addition, the articles 14 need not be positioned horizontally on shelves 12 or be maintained in linear trays. All that is required is that a plurality of articles be positioned to advance along a dispensing path (e.g., back-to-front is shown in FIG. 1).

Figure 2:
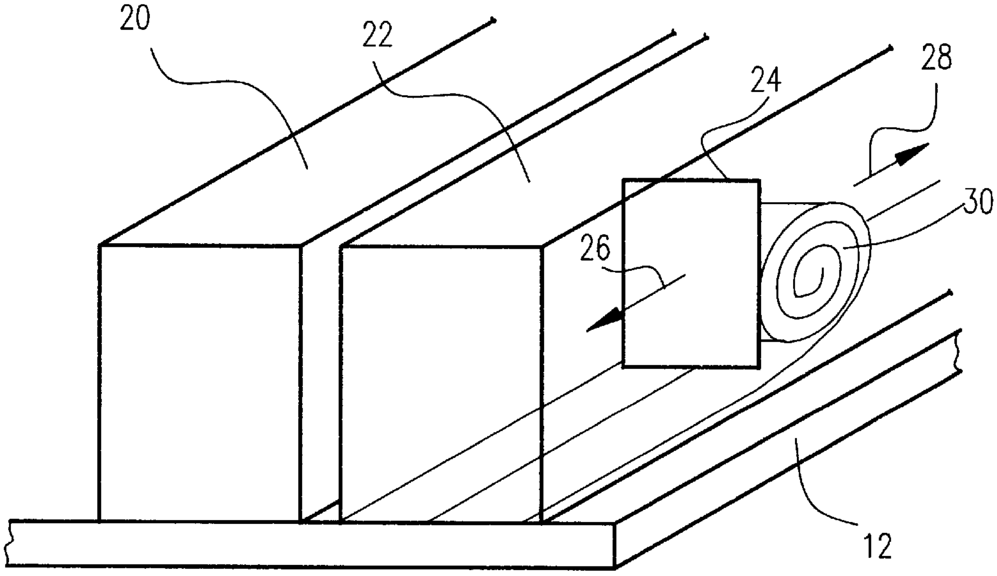
FIG. 2 is a cut-away isometric illustration of a dispensing path or "tray" used in a vending machine/display unit.

FIG. 2 shows dispensing paths 20 and 22. For exemplary purposes, the dispensing paths 20 and 22 are shown in a horizontal configuration, and each dispensing path will be stocked with articles 14 one behind the other as shown in cut-away section 16 of FIG. 1. FIG. 2 shows a sliding back support 24 which moves from back-to-front in dispensing path 22 as indicated by arrow 26 when articles are being dispensed, and from front-to-back as indicated by arrow 28 when the dispensing path 22 is being loaded with articles to be dispensed. The dispensing paths 20 and 22 may take the form of trays which are installed on shelves 12 of the vending machine/display unit 10 shown in FIG. 1; however, the dispensing paths may be non-linear in some applications in accordance with this invention. FIG. 2 shows spring 30 used to push the back support 24 and articles (not shown) along the dispensing path 22; however, it should be understood that other mechanisms may be used to drive the back support 24 forward. In vending machines, it is desirable to have the drive mechanism for each dispensing path move the back support 24 forward by one increment after a purchaser has inserted the correct amount of money and selected the article to be purchased. In display/storage units, it is desirable that the back support either move the packaged articles forward or move forward with the packaged articles towards the front restraint following removal of the desired number of packs by the customer or establishment employee. Thus, this invention is contemplated to be useful with any mechanism for incrementally moving articles along a dispensing path or which moves along with articles along the dispensing path; again, gravity might be used in the vertical mode.

FIG. 3 shows an encoder bar 32 positioned adjacent a dispensing path. An encoder head 34 is mounted on back support 24 and is positioned to interact with a plurality of electrical information lines 36 which run the length of the encoder bar 32. As the spring 30 or other drive mechanism incrementally advances the back support in direction 37 to dispense an article from the dispensing path, the position of the encoder head 34 with respect to the encoder bar 32 is determined, and is indicative of the number of articles which remain in the dispensing path in front of back support 30. This information can be used to provide both an inventory of the number of articles remaining as well as an accounting of the number of articles which have been dispensed from the dispensing path.

FIGS. 4 and 5 illustrate one exemplary configuration of the invention wherein fifteen packaged items could be contained in each dispensing path or "tray" of the vending machine/display unit. However, it should be understood that the counting mechanism of this invention can be modified to accommodate any number of articles to be dispensed from a dispensing path such as a tray container or the like.

FIG. 4 shows a counting code in the form of a table for counting from 0 to 15. The table is in binary format wherein each entry in the table is either "O" or "1". On the left side of the table is a column of count numbers (Ckt#) identified as 0, 1, 2, and 3, where row 0 represents counts of "1", row 1 represents counts of "2", row 3 represents counts of "4", and row 3 represents counts of "8". Thus, in the arrangement shown in FIG. 4, the rows reflect and correspond to increasing exponential powers of two (i.e., binary format). For exemplary purposes, a count number of "7" is identified by a "1" in row 0, a "1" in row 1, a "1" in row 2, and a "0" in row 3. The summed count number represents the number of articles, such as cigarette packs or boxes of candy or cans, which are present in a dispensing path. It can be seen from FIG. 4 that each count number is represented by a unique code of ones and zeros in rows 0–3, which could be expanded infinitely. The maximum number of articles "P" that can be counted is determined by the equation $$P=2^n-1$$

where n is the number of information lines available. In FIG. 4, four such lines (identified as ckt#0–3) result in $$P=2^4-1=16-1=15$$

FIG. 5 shows an electrical arrangement for implementing the counting code of FIG. 4. Specifically, FIG. 5 shows electrical information lines **36*a*, 36*b*, 36*c*, and 36*d* which correspond to electrical information lines 36 shown on FIG. 3 and, at the end of each line 36*a*–*d* for electrical pickoff, represent an electrical binary state of "on" (shown by a "1" in FIG. 4 and made possible by an electrical contact between an active state point 40 and an encoder head contact member 42***a–d*) or "off" (shown by a "0" in FIG. 4 and due to a lack of aforementioned contact). Each of the electrical information lines 36*a–d* has a plurality of active state contact points 40 distributed along its length. By contrasting the table of FIG. 4 with the electrical information lines 36*a–d* of FIG. 5, it can be seen that the active state contact points 40 form a pattern that reflects the ones and zeros in the table. Thus, the pattern uniquely identifies each of a plurality of positions in the dispensing path. In the embodiment discussed above, the invention involves having the moveable encoder head 34 shown in FIG. 3 interact with the active state contact points 40 shown in FIG. 5 on the electrical information lines 36*a–d* to identify the position of the encoder head 34 with respect to the encoder bar. Another embodiment of the invention could include combining or making continuous, side-by-side contact points, as shown by the "dashed" lines in ckt#s 1–3.

By contrasting FIGS. 3, 4, and 5, it can be seen that the encoder head 34 is slightly left of center of the encoder bar 32. At this position, the encoder head 34 would contact active state contact points 40*a,* 40*b,* and 40*c* on electrical information lines 36*a,* 36*b,* and 36*c,* respectively. No contact would be made to electrical information line 36*d.* With this information, a simple processor, such as a computer or the like, will discern that there are 7 packs or articles remaining in the dispensing path according to the code provided in FIG. 4, and provide this information in variety of ways including any or of the following manners:

light emitting diode (LED) or liquid crystal display (LCD) for the individual tray;

data transfer to a machine/display unit processor for further manipulation, summing, data display, or electronic forwarding; and input into a digital-to-analog (D-A) converter for simplified output. Thus, an inventory of 7 packs remaining or an accounting of 8 packs dispensed is readily determined and provided.

FIGS. 6 and 7 show one embodiment of the encoder head 34 where an electrical interaction between the encoder head 34 and the active site contact points 40 on the electrical information lines 36*a–d* is used to derive positional information, this positional information being representative of inventory and accounting information. However, it should be understood by those of skill in the art that an optical interaction could be used in place of the electrical interaction. In addition, other types of interactions such as magnetism, might also be employed.

With reference to FIGS. 6 and 7, it can be seen that the encoder head 34 has four discrete contact members 42*a,* 42*b,* 42*c,* and 42*d* for information line contact (ckt#0–1), and one power contact 44 to pickoff the 5 Volt (5 V) or other power source from the power bar 38 and provide this power to discrete contact members 42*a–d* via conductive material located in the encoder head 34 body. Thus, contact members 42*a–d* and power contact 44 are always at the same voltage potential. The contact members 42*a–d* and power contact 44 may be bowed outwardly in the central region 48 to allow them to better engage the active site contact points 40 on the electrical information lines 36. The active site contact points 40 shown in FIG. 5 may also be similarly bowed outwardly. Both the contact members 42*a–d*and power contact 44 shown in FIGS. 6 and 7 and the active site contact points 40 shown in FIG. 5 can be made of a spring material or be a conductive material that is spring biased, such that the contact members 42*a–d,* power contact 44 and contact points 40 are biased towards one another. Alternatively, either the contact members 42*a–d,* power contact 44 or the active site contact points 40 can be a solid conductive material, and the corresponding contact member or contact point can be a solid or spring biased material. Regardless of the configuration, the objective is to have the active site contact points 40 on the electrical information lines 36*a–d* detect the voltage present on the discrete contact members 42*a–d* on the encoder head and provide this state voltage at the end of each encoder information line 36 for detection and input to the encoding processor. Thus, as spring 30 moves back support 24 incrementally along the dispensing path, the active site contact points 36*a–d* sense the voltage of the head discrete contact members 42*a–d* and, using this information, the position of the encoder head 32 relative to the encoder bar 34 is determined such that both an accurate inventory of the articles remaining in the dispensing path can be determined and/or an accounting of the articles dispensed from the dispensing path can be determined. Preferably, the encoder head 34 includes a mechanical guide 50 or other mechanism for slidably securing the encoder head 34 to the encoder bar 32. The mechanical guide 50 will be designed to allow the encoder head to slip along the encoder bar 32 as the spring 30 incrementally advances along the dispensing path, but will maintain the encoder bar 32 in close proximity to the discrete contact members 42*a–d* so that the active contact points 40 on electrical information lines 36*a–d* can be readily determined.

While FIGS. 6 and 7 show the encoder head 34 secured to the back support by screws 52, it should be understood that other mechanisms for joining can also be used including welding, riveting, gluing, etc. In addition, the encoder head 34 does not necessarily need to be secured to one side of the back support 24, it should be understood that the encoder bar could be mounted above, below, and to either side of the articles being dispensed, and that the encoder head 34 would be correspondingly positioned to interact with encoder bar 32. Furthermore, while FIGS. 6 and 7 show a preferred embodiment where the encoder head 34 is connected to the back support 24, it should be understood that the encoder head 34 does not need to be connected to the back support 24. In another embodiment especially applicable to canned and bottled beverages that might be stacked vertically, an encoder head could move down the encoder bar due to gravity or mechanical means. In all cases, all that is required is to have the encoder head 34 advance with incremental dispensing of articles from a dispensing path and interact with electrical information lines 36 on an encoder bar 32, whereby the relative position of the encoder head 34 to the encoder bar 32 is indicative of the inventory in the dispensing path.

FIGS. 5 and 7 also illustrate a continuous power source electrical line 38, such as a 5 Volt line, and a power pick up 44 that is in electrical contact with the electrical line. This power source electrical line 38 on the encoder bar 32 provides power to the discrete contact points 42*a–d* via a conductive element in the encoder head 34 from the power pick up 44 positioned on the encoder head.

A distinct advantage of the system described in FIGS. 3–7 is that the position of the encoder head relative to the encoder bar is used to determine inventory and dispensing information. Thus, if the vending machine/display unit experiences a power outage or other disruption, the number of articles in the vending machine will be readily determined upon restoration of power since the position of the encoder head does not change during such disruptions. Therefore, upon restoration of power, the active site contact points sensed by the discrete contact members on the encoder head will provide an accurate measure of inventory. While FIGS.

4 and 5 show an arrangement for detecting fifteen articles or packs in a dispensing path, it can be well understood that the arrangement can be varied to accommodate any number of articles or packs or cans and bottles. In addition, the pattern of active site contact points shown in FIG. 5 can be varied considerably within the scope of this invention since there are several ways to represent a unique number. Thus, this invention contemplates using any pattern of active site contact points which uniquely identifies a plurality of positions in a dispensing path. The inventory or accounting information for each dispensing path in a vending machine can be readily provided to a person servicing the vending machine using a display, printout, or some other suitable medium including electronic transmission. This information can then be used to make stocking and accounting decisions. Computer processors can be used to combine, quantify, process, and evaluate the inventory information for each dispensing path as well as the entire vending machine.

Figure 8:
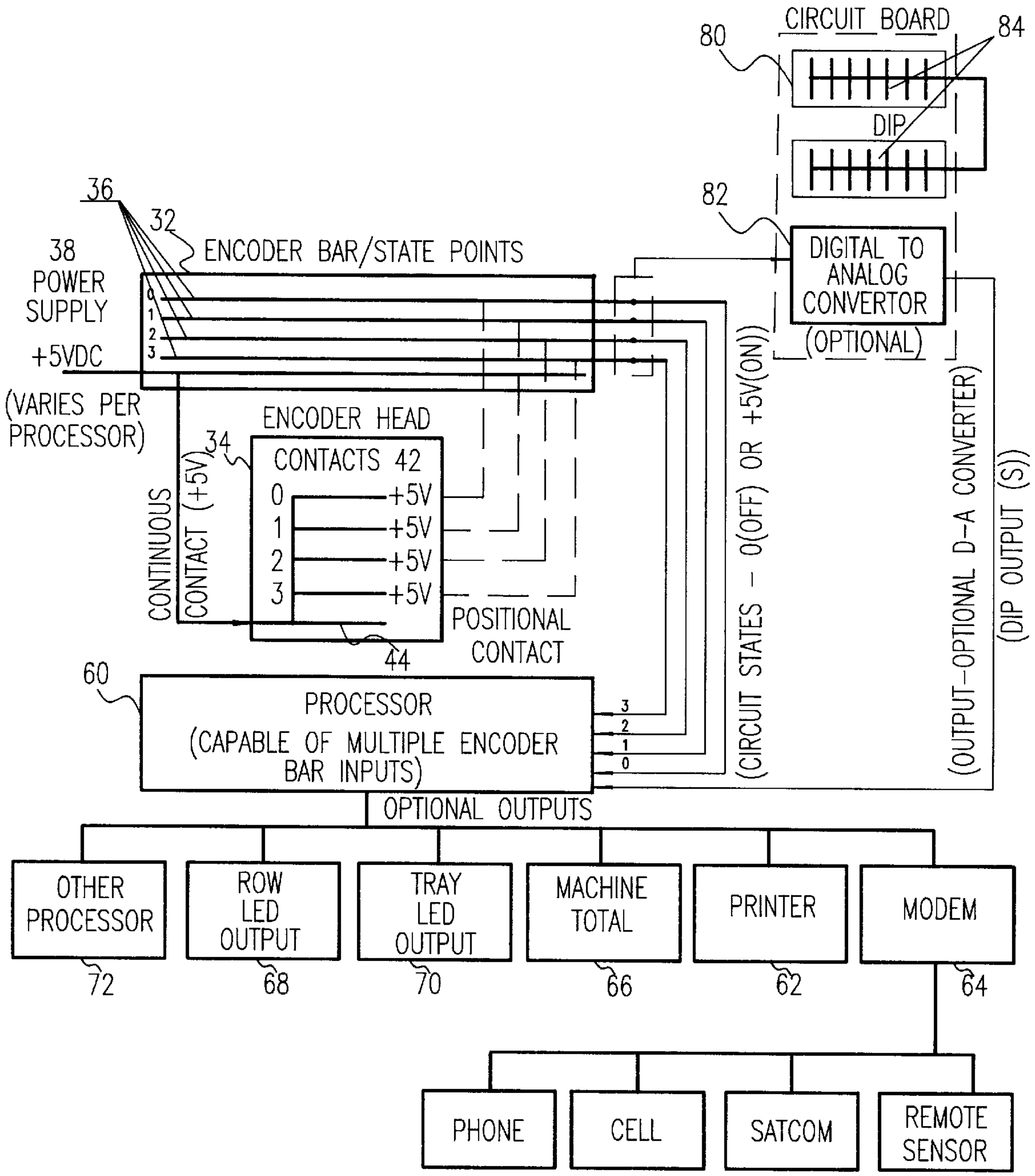
FIG. 8 is a block diagram of the electronic counter set forth in FIGS. 3–7.

FIG. 8 presents a block diagram of the electronic counter of this invention as set forth above in conjunction with FIGS. 3–7. The encoder bar 32 includes a plurality of electrical information lines 36, and a power line 38, and an encoder head 34 having a plurality of contact members 42 that engage contact points on the electrical information lines 36 and a power contact 44 which continuously engages power line 38 is slidably disposed on the encoder bar 32 and maintains positional contact therewith. Circuit state information, based on the relative position of the encoder head 34 on the encoder bar, is fed to a processor 60 which determines inventory and accounting information. The processor 60 typically will be designed to handle the input of several encoder bar 32 inputs. The processor 60 may provide a wide variety of outputs including a hard copy inventory via a printer 62, inventory data transfer via a modem 64, machine total information by a display 66, separate row and tray LED outputs 68 and 70, respectively, and electronic information output to a remote processor 72 for further manipulation and analysis.

The outputs from the encoder bars might first be fed to a digital-to-analog (D-A) converter 82 for initial processing. The D-A converter could be positioned on a circuit board 80 co-located with the encoder bar ends. The circuit board 80 might also possess one or more DIP switches 84 to encode outputs for brand type or tray location information.

While this invention has been described in terms of its preferred embodiments, those skilled in the art will recognize that the invention can be practiced with modification within the spirit and scope of the appended claims.

We claim:

1. A counting mechanism for use in a vending machine or display unit, comprising:

an encoder bar positioned adjacent a dispensing path for a plurality of articles;

a plurality of electrical information lines positioned on said encoder bar adjacent to said dispensing path;

a plurality of active state points positioned on each of said plurality of electrical information lines, said plurality of active state points arranged in a pattern on said plurality of electrical information lines which uniquely identifies each of a plurality of positions in said dispensing path;

an encoder head which is moveable along said dispensing path and is positioned adjacent said encoder bar at a point where said encoder head interacts with said active state points on said plurality of electrical information lines; and means for determining inventory information for said plurality of articles in said dispensing path from a position of said plurality of positions in said dispensing path determined by an interaction of said encoder head with said active state points.

2. The counting mechanism of claim 1 wherein said active state points are conductive elements which contact a plurality of discrete contact members on said encoder head.

3. The counting mechanism of claim 2 further comprising a biasing means to bias said active state points and said discrete contact members together.

4. The counting mechanism of claim 1 further comprising a power source electrical line positioned on said encoder bar adjacent said plurality of electrical information lines and a power pickup positioned on said encoder head, said power pickup being in electrical contact with said power source electrical line.

5. The counting mechanism of claim 1 wherein said encoder head includes a mechanical connector which secures said encoder head to said encoder bar, and which allows said encoder head to slide on said encoder bar along said dispensing path to each of said plurality of positions in said dispensing path.

6. The counting mechanism of claim 1 wherein said encoder head is mounted on a sliding support in said dispensing path.

7. The counting mechanism of claim 2 wherein each of said plurality of positions is identified by one or more active state points on said electrical information lines contacting one or more discrete contact members on said encoder head.

8. The counting mechanism of claim 1 further comprising a power source line positioned on said encoder bar and a means for providing continuous power to discrete contact members on said encoder head.

9. The counting mechanism of claim 2 wherein said conductive elements on said electrical information lines are continuous over a plurality of adjacent positions.

10. The counting mechanism of claim 1 further comprising a circuit board with a digital to analog converter connected to said encoder bar positioned to process electrical information on said electrical information lines.

11. The counting mechanism of claim 10 further comprising a plurality of DIP switches on said circuit board.

* * * * *